United States Patent Office 3,495,437
Patented Feb. 17, 1970

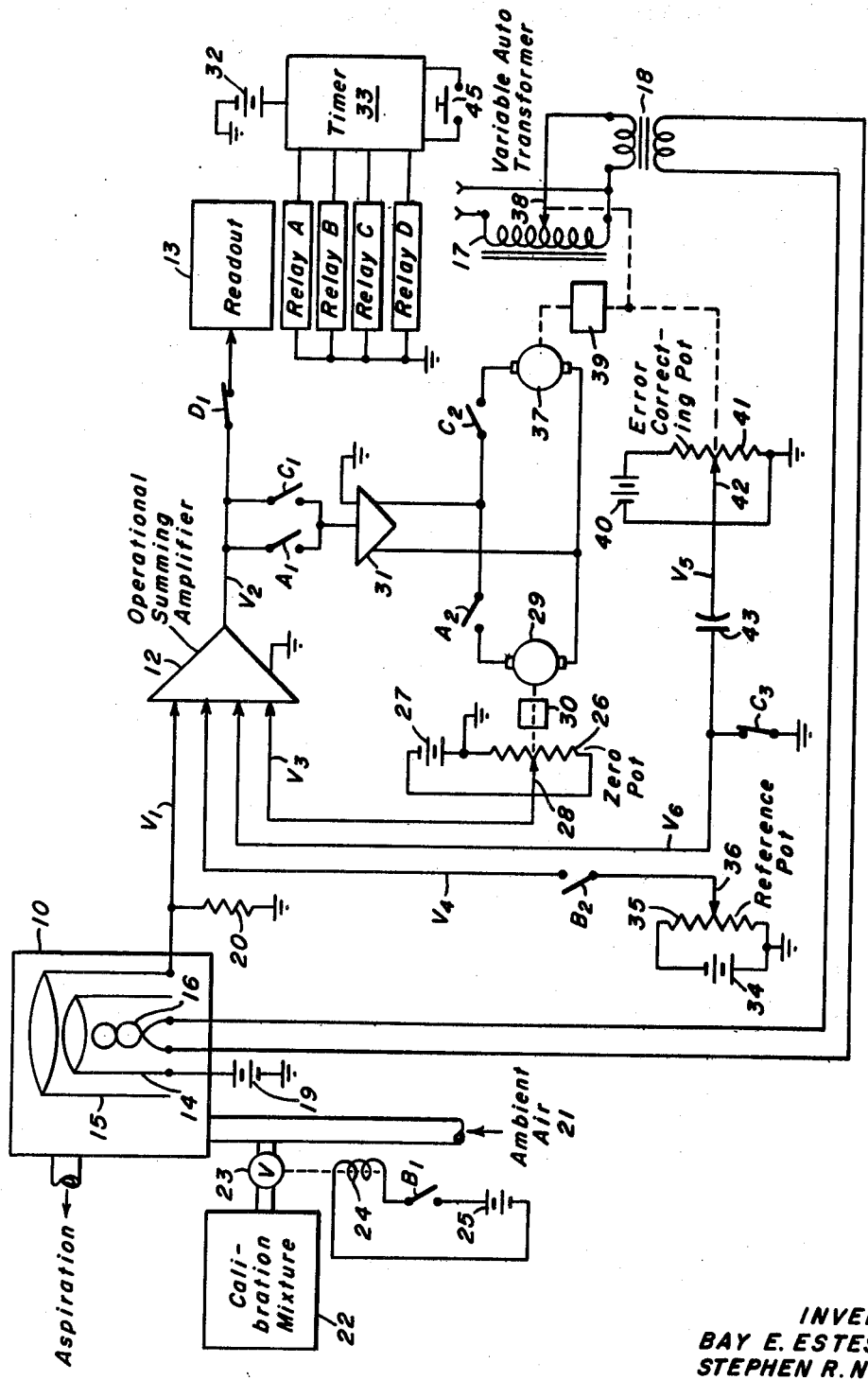

3,495,437
METHOD AND APPARATUS FOR ZERO-SETTING AND CALIBRATING VAPOR-RESPONSIVE DETECTORS
Bay E. Estes III, Plum Borough, and Stephen R. Novak, Baldwin Borough, Pa., assignors to United States Steel Corporation, a corporation of Delaware
Filed May 9, 1968, Ser. No. 727,799
Int. Cl. G01c 17/38
U.S. Cl. 73—1                6 Claims

ABSTRACT OF THE DISCLOSURE

A method and apparatus for zero-setting and calibrating detectors used in locating surface flaws in metal bodies. Applies to a flaw-detection method in which a volatile halogen compound is applied to the surface and penetrates flaws. Detector locates areas which continue to give off vapors, but requires frequent calibration because vapor residues accumulate inside it and lower its sensitivity. Invention sets the detector to zero and calibrates it automatically.

---

This invention relates to an improved method and apparatus for zero-setting and calibrating vapor-responsive detectors.

One method of locating surface flaws in metal bodies involves applying to the surface of the body a volatile liquid which flows into surface openings, such as seams, scabs, cracks or the like. The liquid commonly is a halogen-containing organic compound, for example trichloroethane. Excess liquid is removed from the surface, leaving no more than a trace except where the liquid has penetrated an opening in the surface. The surface then is scanned with detectors to locate areas which continue to give off a relatively high concentration of vapors. Such areas represent flaws, which subsequently are removed, as by scarfing operation. Reference can be made to Roberts Patent No. 3,229,513 for a detailed showing of such a method.

The detectors used in this method may be adaptations of commercially available devices intended primarily for locating leaks in apparatus which utilize halogen-containing compounds. For example, a detector of this type is manufactured by General Electric Company and is described in a printed publication by the manufacturer, "GE Apparatus Catalog—Meter and Instrument Volume, Section 8240." This detector is used most commonly for locating leaks in refrigerators which utilize "Freon," one of several fluorine compounds. The detector includes a tubular cathode, a tubular platinum anode housed within the cathode, and an electric heater inside the anode. A stream of air, which may contain vapors of the halogen compound, is drawn between the anode and cathode from the surface of the body, while the anode is heated to a temperature in the approximate range 1400–1600° F. The ionic current transmitted between the anode and cathode is proportionate to the concentration of halogen compound vapors. This proportion (or sensitivity) is determined by the anode temperature, which is adjusted by changing the current to the anode heater. The detector is calibrated by adjusting the magnitude of current applied to the heater.

One problem in locating flaws by this method is that the detectors must be recalibrated at frequent intervals and new zero-settings established. With repeated use, detectors become contaminated with vapors which accumulate on the surfaces of their anodes. As a result, the zero-settings and sensitivity of the detectors continually change. Frequent adjustments are necessary in the zero-setting to enable the apparatus to differentiate between good surface and flaws. Frequent recalibration is necessary to enable the detectors to indicate the magnitude of a flaw. One form of calibrating apparatus is shown in an earlier patent of the present co-inventor Novak, No. 3,290,920. A full-scale installation may include several hundred detectors, and it becomes impractical for technicians to reset and calibrate them by hand with apparatus presently available, such as that shown in the Novak patent.

An object of our invention is to provide an improved zero-setting and calibrating method and apparatus which are rapid, automatic and accurate.

A more specific object is to provide a method and apparatus of the foregoing type in which we successively introduce air and a calibration mixture of known concentration to a detector and make corrections through automatic adjustments of both the zero-setting and the heating current.

In the drawing:

The single figure is a schematic wiring diagram of our apparatus.

The drawing shows a detector 10 for halogen compounds and an operational summing amplifier 12, input and output terminals of which are connected respectively to the detector and to a readout device 13. The detector has an anode 14, a cathode 15 and a heater 16. Heating current is supplied to the heater 16 through a variable transformer 17 and an isolation transformer 18. The anode 14 receives a positive voltage from a power source 19. Thus the cathode 15 is placed at a negative potential with respect to the anode, whereby the cathode attracts positive ions. Ionic current between the anode and cathode passes through a resistor 20 to ground and produces a potential $V_1$ proportional to the ionic current and hence to the concentration of halogen compound between the anode and cathode. Voltage $V_1$ is transmitted to the summing amplifier 12, which applies corrections as hereinafter explained, and transmits a voltage $V_2$ to the readout device 13 proportional in magnitude to the concentration of halogen compound picked up by the detector. The detector can be of the type previously identified, and it operates as described in the Roberts patent, except that we have added the operational summing amplifier. The summing amplifier per se is a known device available commercially. One example is the Model D–16 Operational Amplifier of Data Device Corporation, Hicksville, N.Y.

We connect a source 21 of ambient air to the detector 10. We also connect a source 22 of a calibration mixture of air and halogen compound of known concentration. We use these sources in zero-setting the apparatus and calibrating the detector, as hereinafter explained. We control admission of the calibration mixture from source 22 through a normally closed valve 23, which has an operating solenoid 24 and a power source 25 for energizing the solenoid.

ZERO-SETTING CIRCUIT

The zero-setting circuit of our apparatus includes a potentiometer 26 which is connected to a power source 27 and has an adjustable arm 28 connected to an input terminal of the operational amplifier 12. The power source 27 transmits a voltage $V_3$ through the potentiometer to the summing amplifier. Voltage $V_3$ opposes voltage $V_1$, and the position of arm 28 regulates its magnitude. Voltage $V_2$, which is transmitted to the readout device 13, normally equals the difference between voltages $V_1$ and $V_3$, but is subject to further temporary calibration corrections hereinafter explained. A motor 29 operates arm 28 through a gear box 30. We actuate motor 29 through a power amplifier 31. The circuit also includes a power source 32, a timer 33 connects to the power source, and a first relay A, the coil of which is connected to the timer, along with the coils of other relays of the calibrating circuit hereinafter described. Relay A has two normally open contacts $A_1$ and $A_2$, which we connect respectively between an output terminal of the summing amplifier 12 and an input terminal of the power amplifier 31, and between an output terminal of the power amplifier and motor 29. The power amplifier and timer per se are known devices available commercially. One example of a suitable power amplifier is Model 1561 Torque Motor Drive Amplifier of Milior Electronics Corporation, Farmingdale, N.Y. One example of a suitable timer is the "Series 2300 Cam Timer" of Automatic Timing and Controls, Inc., King of Prussia, Pa.

After the detector has operated for a time, some halogen compound vapors usually accumulate on its anode 14. The accumulation causes the detector to transmit an ever-increasing voltage $V_1$ to the summing amplifier 12 and thence to the readout device 13. The latter soon reads too high and shows a positive reading even when air alone is drawn through the detector. When the error reaches a magnitude that a new zero-setting is needed, we start the timer 33, which energizes relay A and closes contacts $A_1$ and $A_2$. We wait to do this until the detector has been clear of a test body long enough that it has reached a steady state with air alone being drawn through. The summing amplifier 12 now transmits voltage $V_2$ through contact $A_1$ to the power amplifier 31, which energizes motor 29 through contact $A_2$. The motor moves arm 28 to a new position in which voltage $V_3$ again balances voltage $V_1$ with air alone passing through the detector. Voltage $V_2$ return to zero and motor 29 stops. Thereafter timer 33 deenergizes relay A, which needs to be energized only about a second to establish a new zero setting.

CALIBRATING CIRCUIT

The calibrating circuit of our apparatus includes a power source 34, a reference potentiometer 35 connected to the power source, and second and third relays B and C, the coils of which are connected to the timer 31. The potentiometer 35 has an adjustable arm 36. We set arm 36 manually to a position that the voltage $V_4$ transmitted therefrom is equal to but opposite the change in voltage $V_1$ which detector 10 should transmit when the calibration mixture from source 22 passes therethrough. Relay B has two normally open contacts $B_1$ and $B_2$ which we connect respectively between solenoid 24 and its power source 25 and between arm 36 and an input terminal of the summing amplifier 12. The circuit also includes a motor 37 which operates an adjustable arm 38 of the variable auto-transformer 17 through a gear box 39. Relay C has two normally open contacts $C_1$ and $C_2$ which we connect respectively between an output terminal of the summing amplifier 12 and an input terminal of the power amplifier 31 (parallel with contact $A_2$) and between an output terminal of the power amplifier and motor 37.

After a new zero-setting is established and relay A deenergized, the timer 33 energizes relay B and closes contacts $B_1$ and $B_2$. Solenoid 24 is energized through contact $B_1$ and opens valve 23, whereupon the calibration mixture from source 22 is drawn through the detector 10. At the same time the potentiometer 35 transmits voltage $V_4$ through contact $B_2$ to the summing amplifier. After an interval long enough for the detector to reach a steady state (about 30 seconds), the timer 33 energizes relay C and closes contacts $C_1$ and $C_2$. Relay B remains energized. If voltage $V_1$ minus $V_3$ is unequal in magnitude to voltage $V_4$, the summing amplifier transmits a new voltage $V_2$ through contact $C_1$ to the power amplifier 31, which energizes motor 37 through contacts $C_2$. Motor 37 moves arm 38 of the variable transformer 17 in a direction to produce the proper adjustment in the current to the heater 16.

ERROR CORRECTION

Adjustments in the heating current alter the temperature of the anode 14 rather slowly. Commonly about 15 minutes are required for the temperature to reach a steady state. Hence the tendency would be for the motor 37 to continue to run and overcorrect any error. Our calibrating circuit also embodies means for preventing such overcorrection. Such means includes an adjustable power source 40 and an error-correcting potentiometer 41 connected to the power source. The potentiometer has an adjustable arm 42 which we connect to an input terminal of the summing amplifier 12 through a capacitor 43. Relay C has a normally closed contact $C_3$ which we connect between capacitor 43 and ground.

When motor 37 moves arm 38 of the variable transformer 16, it also moves arm 42 of the potentiometer 41. Contact $C_3$ opens when relay C is energized, removing the ground 44. Since the capacitor 43 is at ground potential initially, the potentiometer 41 does not immediately transmit a voltage to the summing amplifier 12. As motor 37 moves arm 42 of the potentiometer 41, the change in voltage $V_5$ on arm 42 is transmitted through capacitor 43 to the summing amplifier. The capacitor 43 is large enough so that it is not significantly charged or discharged by loading from the summing amplifier. Thus, voltage $V_6$ is nearly equal to the change in voltage $V_5$. The voltage $V_6$ is produced in a direction to reduce the voltage $V_2$ and very soon the motor 37 moves arm 42 enough to cause voltage $V_2$ to approach zero and the motor 37 stops. Thus, motor 37 has also moved arm 38 of the variable auto-transformer by an amount proportional to the original calibration error between voltage $V_1$ minus $V_3$ and voltage $V_4$. By the proper initial adjustment of the power source 40 and the judicious selection of resistance-charge-versus-displacement curve for the error-correcting potentiometer 41, the value of this proportion may be made such that the heating current is adjusted by nearly the proper amount.

After these corrections are made, timer 33 deenergizes relays B and C. Preferably the apparatus includes a fourth relay D also connected to the timer 33. Relay D has a normally closed contact $D_1$ which we connect between the summing amplifier 12 and the readout device 13. The timer energizes relay D before the zero-setting operation begins and deenergizes it after calibration is finished. Energizing relay D breaks the connection to the readout service 13, which is not needed during these operations. The apparatus is ready for normal operations as soon as relays B, C and D are energized. Anode 14 gradually comes to its new temperature in accordance with the adjustment of transformer 17.

From the foregoing description it is seen that our invention affords a simple, reliable method and apparatus for zero-setting and calibrating a vapor-responsive flaw detection apparatus. The operation is fully automatic in that it is necessary only to start the timer with a push button 45 for the full cycle of zero-setting and calibration to take place. The timer of course can be set to initiate the cycle periodically.

While we have shown and described only a single embodiment of our invention, it is apparent that modifications may arise.

We claim:

1. A method of zero-setting and calibrating a flaw-detection apparatus of the type which includes a vapor-responsive detector having an anode and cathode, electric means connected to said detector for heating its anode, summing means connected to said detector, and a readout device connected to said summing means, said detector transmitting to said summing means a voltage proportional in magnitude to the concentration of vapor passing therethrough, which voltage is subject to inaccuracies resulting from vapor accumulations in the detector;

the zero-setting step of said method comprising:
passing air alone through said detector;

transmitting from said detector to said summing means a first voltage resulting from vapor accumulations and air;

transmitting to said summing means a second voltage opposing said first voltage; and adjusting the magnitude of said second voltage so that it balances said first voltage;

whereby said summing means transmits zero voltage to said readout device when air alone passes through said detector;

the calibration step of said method being performed following the zero-setting step and comprising:

passing through said detector a calibration mixture of vapor and air of known concentration;

transmitting to said summing means a third voltage which opposes the voltage transmitted thereto from said detector and is of a magnitude equal to the voltage which said detector should transmit when the calibration mixture passes therethrough;

and adjusting said heating means in accordance with any difference between said third voltage and the actual voltage transmitted by said detector.

2. A mehod as defined in claim 1 comprising a further step of transmitting to said summing means another voltage to prevent overcorrection during the calibrating step.

3. A method as defined in claim 1 in which the calibrating step automatically follows the zero-setting step.

4. Apparatus for zero-setting and thereafter calibrating a flaw-detection apparatus of the type which includes a vapor-responsive detector having an anode and cathode, electric means connected to said detector for heating its anode, summing means connected to said detector, and a readout device connected to said summing means, said detector transmitting to said summing means a voltage proportional in magnitude to the concentration of vapor passing therethrough which voltage is subject to inaccuracies resulting from vapor accumulations in said detector;

the zero-setting apparatus comprising:

means connected to said detector for passing air alone through said detector and thereby transmitting from said detector to said summing means a first voltage resulting from vapor accumulations and air;

means connected to said summing means for transmitting to said summing means a second voltage opposing said first voltage; and means connected to said last-named means for adjusting the magnitude of said second voltage so that it balances said first voltage;

whereby said summing means transmits zero voltage to said readout device when air alone passes through said detector;

the calibrating apparatus comprising:

means connected to said detector for passing through said detector a calibration mixture of vapor and air of known concentration;

means connected to said summing means for transmitting to said summing means a third voltage which opposes the voltage transmitted thereto from said detector and is of a magniture equal to the voltage said detector should transmit when said calibration mixture passes therethrough; and means connected to said detector for adjusting the current to said heating means in accordance with any difference between said third voltage and the actual voltage transmitted by said detector.

5. An apparatus as defined in claim 4 further comprising means connected to said summing means for preventing overcorrection during its calibration.

6. An apparatus as defined in claim 4 further comprising a timer and relays for automatically calibrating said detector following its zero-setting.

References Cited

UNITED STATES PATENTS 2,582,647    1/1952    Morgan _____ 324—33
3,310,974    4/1967    Banks.

S. CLEMENT SWISHER, Primary Examiner

U.S. Cl. X.R.

324—33